Oct. 18, 1927.
H. R. SLIVINSKI
1,645,625
SAND CUTTING AND MIXING MACHINE
Filed Feb. 2, 1924   3 Sheets-Sheet 1
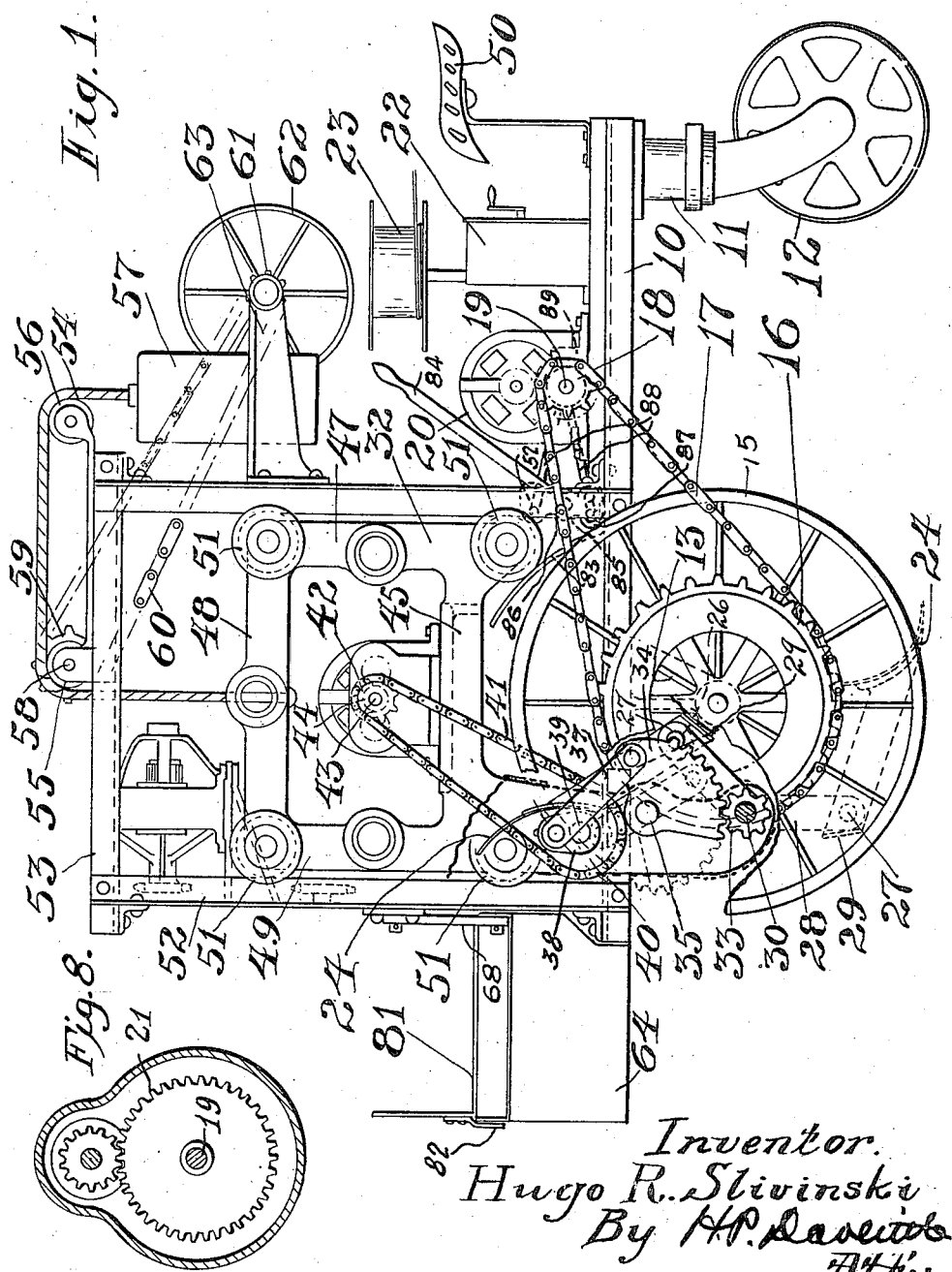
Inventor.
Hugo R. Slivinski
By H. P. Daveiss
Atty.

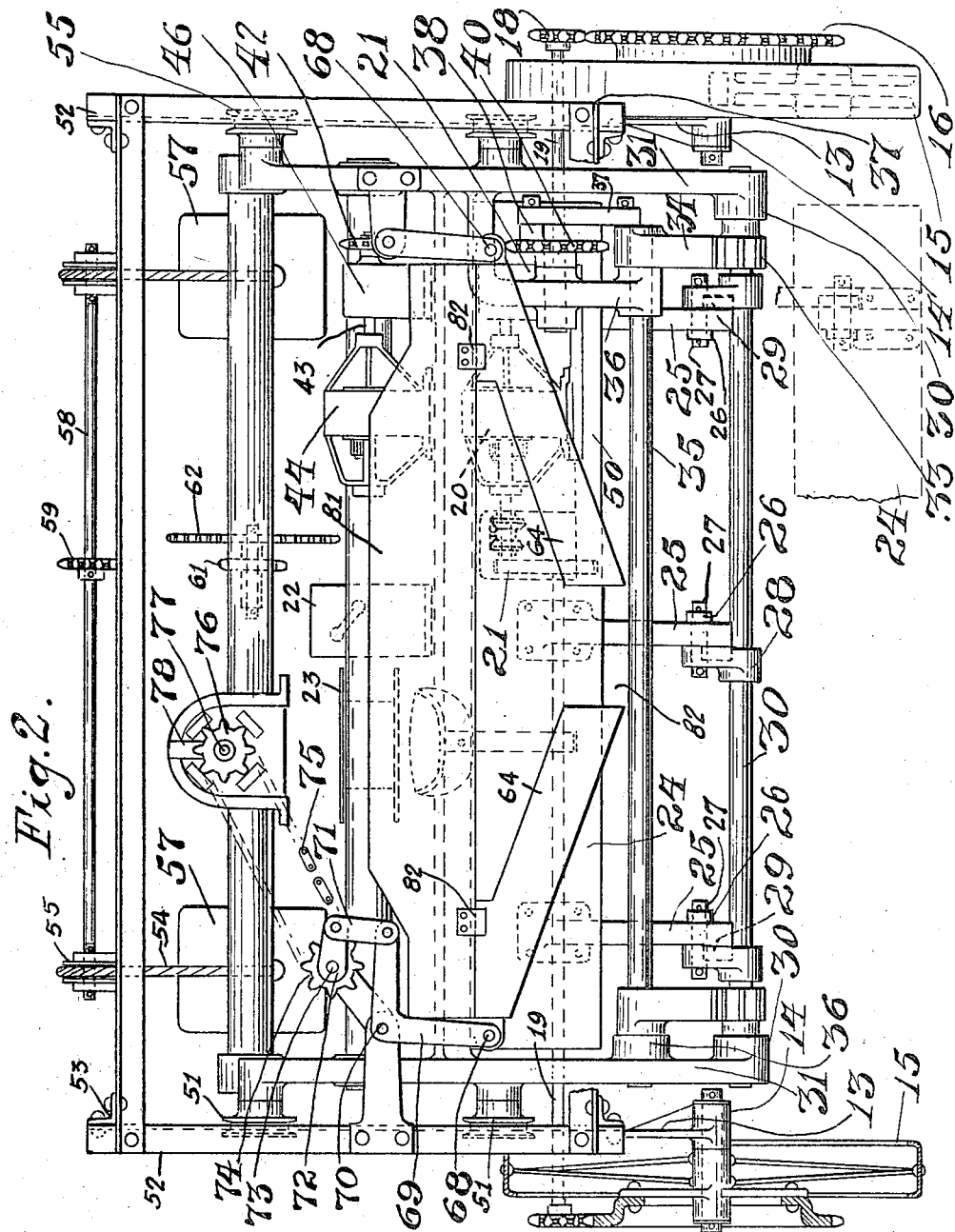

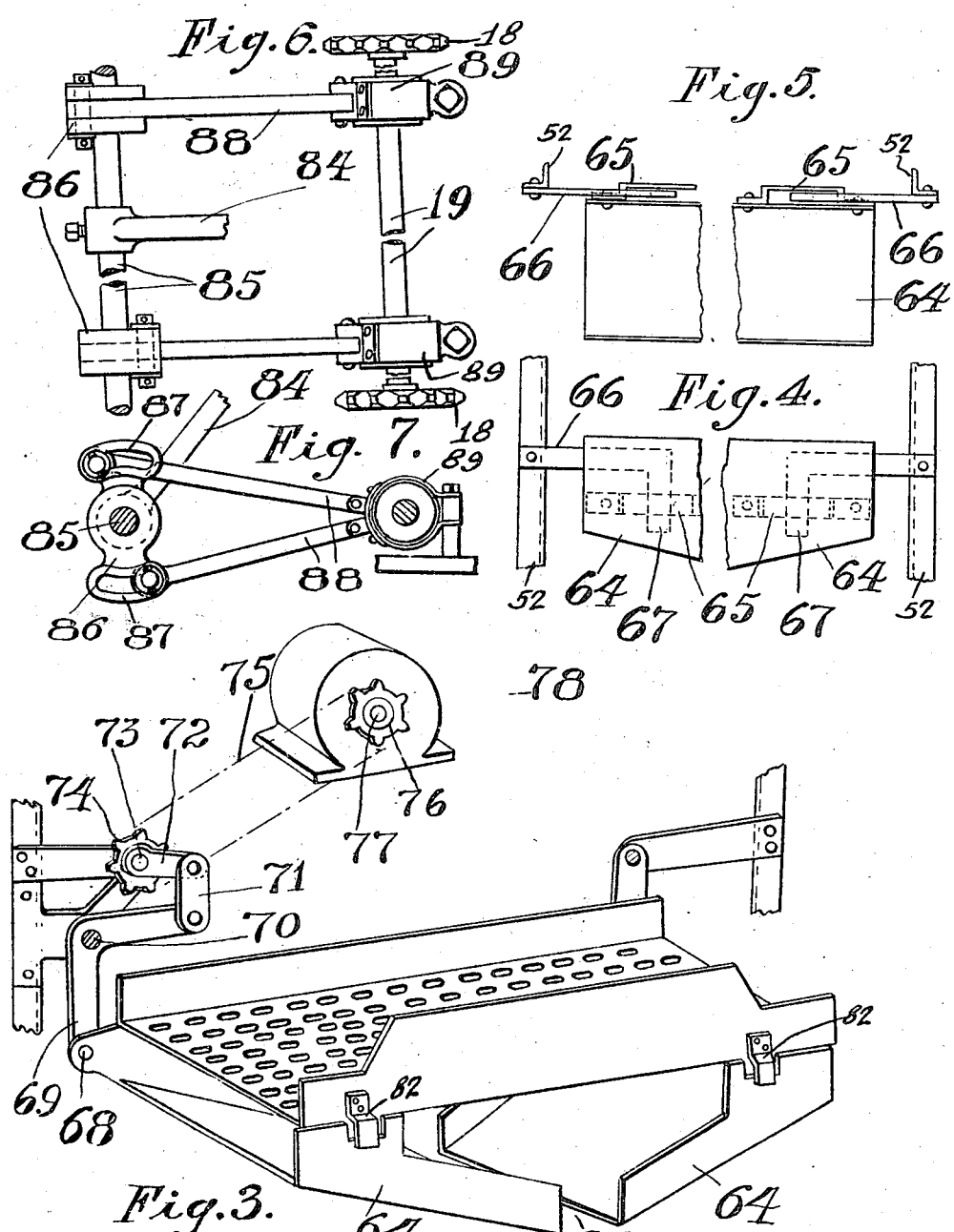

Patented Oct. 18, 1927.

1,645,625

UNITED STATES PATENT OFFICE.

HUGO R. SLIVINSKI, OF CHICAGO, ILLINOIS.

SAND CUTTING AND MIXING MACHINE.

Application filed February 2, 1924. Serial No. 690,143.

My invention relates to sand cutting and riddling machines for conditioning molding sand in foundries and has for one of its objects the provision of a machine of very simple construction adapted to effectively cut and disintegrate and cool molding sand and which machine shall be composed of few parts, obviating expense in repair and upkeep and capable of convenient control and operation by a single operator.

Another object of the invention is to throw the sand to a riddle in a direction away from the operator.

Another object of the invention is to enable the machine to be conveniently positioned with respect to the pile of sand to be operated upon so that the cutting and discharging member may engage the pile of sand at any desired point and at any desired elevation.

Another object of the invention is to provide a machine carrying a sand riddle which shall be so positioned as to provide a compact arrangement of parts and such that the machine may be closely approached to the walls of the foundry.

Another object of the invention is to provide, in efficient operative relation with the riddling, and the cutting and disintegrating mechanism, a hopper for directing the flow of sand from the riddle to the place of deposit.

Another object of the invention is to provide a construction whereby either the riddle or the hopper or both may be readily removed, by means of which removal, the total length of the machine may be shortened so that the latter may be still more closely approached to the wall of the foundry.

Another object of the invention is to provide means of a simple and easily operated character capable of manipulation manually by the operator for raising and lowering the cutting and throwing member and its operating parts.

Other objects of the invention will appear from the following specification and appended claims.

The invention is illustrated in the accompanying drawings in which—

Fig. 1 is a side view in elevation of a machine embodying my invention showing the carrier for the cutting member in uppermost postion and showing, in full lines, the cutting member at the upper end of its stroke and, in dotted lines, said cutting member at the lower extremity of its stroke;

Fig. 2 is a front end elevation;

Fig. 3 is an enlarged detail perspective view of the hopper and riddle and means for vibrating the hopper;

Fig. 4 is a detail front view of the hopper showing, in dotted lines, the means for guiding the hopper;

Fig. 5 is a detail plan view of said hopper guiding means;

Fig. 6 is a detail plan view of part of the steering mechanism; and

Fig. 7 is a detail side view of part of said steering mechanism.

Figure 8 is a detailed cross section of a reduction gearing for the traction wheels.

The embodiment of the invention comprises these general features: a frame mounted on front traction and steering wheels and rear wheels, these wheels being of such diameter as to enable the frame to be projected into the upper part of the pile of sand to be worked; a motor connected to the traction wheels for driving the latter; a shovel extending transversely of the machine and having a cutting edge and adapted to have imparted thereto an oscillating movement to enter the sand, cut the same and throw it forward of the frame of the machine; a hopper and a riddle attached to the front of the machine to receive the sand, together with a second motor and driving means for vibrating the hopper; a third motor for operating the shovel; a vertically movable frame or carrier for the shovel and the motor which operates the same; and means for manually operating the lifting and lowering mechanism of this auxiliary frame; speed reducing gearing between the third motor and the oscillating shovel, and suitable controllers mounted adjacent to the seat of the operator whereby the motors may be individually controlled.

Referring to the drawings, 10 is the main frame of the machine which is supported at its rear by the swivel brackets 11 rising from the stub axles of the rear wheels 12. The side sills of the frame 10 extend forward and are supported on vertical brackets 13 fixed to sleeves 14 journaled on the axles of the front traction wheels 15.

To the hub of each of these traction wheels is secured a sprocket wheel 16 driven by a chain 17 which engages a smaller driving sprocket 18, which driving sprockets are mounted at the opposite ends of a transversely disposed driving shaft 19 made in two sections and extending across and beyond the sides of the frame. This shaft is driven by a motor 20 mounted on the rear section of the main frame and which motor is herein conventionally represented as an electric motor, but which may be of any other type, such as a gasoline engine or steam engine. A speed reduction and differential gear mechanism 21 of ordinary type is interposed between the motor and each wheel driving sprocket. The motor 20 is controlled by a controller 22 mounted on the main frame adjacent to the seat 50 of the operator. A reel 23 is provided for the feed wire for the motors.

The member for cutting, throwing and conveying the sand consists of a shovel 24 having a curved face and a cutting edge, the concavity of this shovel being faced toward the rear of the machine. This shovel extends the entire width of the machine and is mounted on a series of brackets 25 projecting forwardly of the machine and provided at the outer ends thereof with sleeve bearings 26, each of these bearings being pivoted to a journal 27 extending from the end of a vertical arm or bracket 28. A stop member 29 is carried at the outer end of each of the bracket arms 25 beyond the edge of the vertical arm 28 so that the pivotal connection between these parts is in the nature of a knuckle joint serving to limit the relative pivotal movement of the two sets of arms. The arms 28 are rigidly secured to a transverse shaft 30 extending across the machine. This shaft is mounted in bearings formed in the lower ends of arms 31 depending from and forming part of the vertically movable auxiliary frame or cutter carrier 32. At each end, the shaft 30 is provided with a spur pinion 33 constituting the driven member whereby the shaft is rotated. Meshing with each of these pinions is a segmental gear 34, which gears are carried at the opposite ends of a transverse shaft 35 extending across the machine and journaled in bearings 36 carried by said auxiliary frame 32. The segmental gears are adapted to be oscillated to impart oscillatory movement to the spur pinions by means of links 37. One end of each link is connected eccentrically to the segmental gear and the other end is pivoted to the end of a crank 38 fixed on the end of a constantly driven rotating stub shaft 39, which is mounted in bearings carried by the auxiliary frame 32 and extends transversely of the machine above the shaft 35.

At one end of said shaft 39 there is provided a sprocket wheel 40 adapted to be driven by a sprocket chain 41 which engages a driving sprocket 42 carried on a shaft 43, which is preferably made in two sections and is adapted to be driven by a motor 44 mounted on a platform 45 carried by the vertically movable auxiliary frame 32. This motor is conventionally shown as an electric motor and may derive its power from a suitable electric current line. Between the sections of the shaft 43 is mounted a speed reducing gear mechanism 46 (conventionally indicated) which is adapted to reduce the speed and increase the power imparted to the oscillatory shovel in order to obtain an effective cutting and lifting action of the shovel.

The auxiliary cutter bar carrier 32 comprises fore-and-aft upright members 47 joined by upper longitudinal member 48 and transverse bars 49. The uprights 47 are provided with a series of grooved rollers 51 adapted to roll on the fixed uprights 52 carried by the main frame and which uprights are joined by longitudinal members 53, thereby forming a vertically projected secondary fixed frame on which the shovel and driving parts mounted on the carrier are adapted to be raised and lowered for the purpose of changing the elevation of the shovel in order to enable the latter to enter the pile of sand first at the top thereof and to be gradually lowered as the pile diminishes. Cables 54 are connected to the upper part of the auxiliary carrier and these cables pass over sheaves 55 and 56 and carry at their respective ends weights 57 which serve to balance the weight of the auxiliary carrier and the parts mounted thereon. The sheaves 55 are fixed on a transverse shaft 58 on which is also fixed a sprocket wheel 59 which is engaged by a sprocket chain 60 extending around a sprocket wheel 61 fixed to the hub of a hand wheel 62, which in turn is rotatably mounted on a bracket 63 extending rearwardly from one of the uprights 52 of the secondary fixed frame. This hand wheel is in suitable position for convenient operation by the operator and, upon rotation of the same, the shaft 58 is adapted to be turned so as to turn the pulley 55 and raise or lower the auxiliary carrier frame 32.

Mounted at the front end of the machine forward of the frame is a laterally vibrating hopper 64. This hopper is provided with offset plates 65, providing slots between the plates and body of the hopper. Horizontally extending bars 66 are fixed to the frame of the machine and extend above the angled ends of the plates 65. The bars 66 have depending arms 67 which extend down through the slots provided by offset plates 65. The hopper is thus restrained and guided in its reciprocating movement. The hopper is detachably hung at its ends on pivot pins 68 carried by the lower arms of bell-crank levers 69, mounted on pivots fixed to the frame at 70. The upper end of one of the bell-cranks is pivoted to a link 71, which is also pivoted to a crank 72 fixed on the shaft 73 adapted to be rotated through a sprocket 74 driven by a chain 75. The chain 75 is connected to a sprocket wheel 76 on a shaft 77 driven by a third motor 78 mounted on the main frame. The hopper comprises two sections rigidly connected together for common reciprocation but separated at 80 at their lower ends which converge downwardly, whereby the sand is directed to a common point below the hopper so as to form a pile. The hopper may be removed from the frame by disconnecting the corners of the hopper from the bell-cranks 69.

Detachably mounted on the hopper above the same is a riddle 81 supported on the hopper by means of hook plates 82. This riddle is adapted to screen the sand deposited therein by the shovel. The riddle and hopper are placed at such a height relative to the cutting shovel that the riddle will receive the sand elevated and thrown forwardly by the shovel, for this purpose the uprights of the riddle being substantially on a line with or just below the highest point of the arc of travel of the shovel. By throwing the sand forward, it will be seen that danger of injury of the operator from the sand is prevented and to further insure this protection and to prevent the escape of the sand from the shovel by centrifugal force in the first part of the shovel's upward travel, a curved shield 83 is provided. It will also be seen that by the provision of the vertical structure constituting the secondary frame, the riddle and hopper may be mounted above the horizontal portion of the main frame sufficiently far to enable the discharged sand to be piled to the required height.

The machine is preferably steered through a steering lever 84 (see Figs. 2, 7 and 8) which operate to apply a brake to either section of the wheel driving shaft 19, so as to act to hold either wheel stationary, whereby the machine may be turned on said wheel. The lever 84 is fixed on a shaft 85, on which is fixed at each end a slotted double arm lever 86 having curved slots 87 in each arm. Brake rods 88 have pins engaging these slots. Each brake rod runs to a brake 89 (conventionally indicated) mounted on a section of the divided wheel driving shaft 19. When the lever 84 is moved in one direction, it will apply the brake on one section and stop the wheel connected thereto and cause the machine to turn around that wheel, and when the lever is turned in the opposite direction, the other brake will be applied and the opposite turning movement effected. The slots 87 permit the necessary relative lost motion between the brake rods.

The operation of the device is as follows:
The machine is adapted to be used in a foundry and is propelled under the power of its traction motor to the pile of sand to be treated for reuse. This sand may be either disposed in single piles or in ridges along the foundry floor. The machine is directed over the pile of said with the wheels straddling the same and with the cutting shovel carrier elevated so that the shovel is in position to engage the upward part of the pile. The machine is then stopped and the motor for driving the shovel is thrown into operation, whereupon the shovel will be oscillated so as to dig into and cut and disintegrate the sand, at the same time lifting a supply of sand upwardly and forwardly similarly to the lifting motion of the human arm. At the end of its upward stroke, the shovel will be given a limited free jerky movement owing to its knuckle joint connection with the arms 26, whereby further disintegration will be imparted to the sand as it is thrown towards the riddle. As the sand is thrown through the space between the shovel and the riddle, it will be cooled and further disintegrated. The riddle is reciprocated with the hopper and serves to break up and screen the sand so as to place it in condition for reuse, which action is further increased as the sand strikes the sloping hopper sections by the agitating action of these parts. The sand is directed by the hopper to the center thereof so as to be deposited in a pile on the floor. The riddle may be removed, if desired, and the sand merely directed through the hopper. Although the construction of the machine thus disclosed enables the device to be closely approached to the wall of a foundry owing to the employment of a single oscillatory shovel and the compactness of the parts, yet to enable a still closer approach to the wall to be accomplished, the riddle and hopper may both be removed, in which case the sand is thrown directly upon the floor by the shovel. As the pile from which the sand is being removed is gradually diminished, the operator lowers the vertically movable shovel carrier to accommodate the shovel to the new level. This operation may be readily effected by the hand wheel owing to the balancing of the carrier by the weights.

Having thus described my invention, what I claim is:

1. A machine for conditioning sand for foundries having a traveling frame and having an oscillatory cutting shovel mounted on said frame and operable to penetrate a pile of sand below the same and cut and toss said sand.

2. A sand cutting machine for conditioning foundry sand having a single oscillatory sand cutting shovel extending substantially the width of the machine, and operable on sand below the frame of the machine to penetrate and toss the same.

3. A portable sand cutting machine, a sand cutting and lifting member mounted thereon adjacent the front end thereof, and means to drive said member to discharge the sand therefrom toward the front end of the machine relative to the direction of travel of the machine.

4. A sand cutting machine having a sand cutting and conveying shovel mounted adjacent the front end of the machine, having its cutting edge projected toward the rear of the machine when in lowered position and means for bodily lifting said shovel and moving it in anti-clockwise direction to discharge the sand therefrom.

5. A sand cutting machine having a frame, a sand cutting and conveying member suspended from said frame and operable to swing bodily in a direction for cutting and conveying the sand from the pile to be treated to a place of discharge in front of the machine.

6. A sand cutting machine having an oscillatory sand cutting and conveying shovel operable to discharge the sand toward the front of the machine, and means for raising and lowering the axis around which the shovel is oscillated relative to the ground.

7. A sand cutting machine having a traveling frame and having a sand cutting and throwing member operable to cut into the upper part of a pile of sand below the frame, and means for perpendicularly lowering and raising said member relative to the ground.

8. A machine for conditioning foundry sand having a sand cutting and tossing shovel, an arm to one end of which said shovel is fixed, oscillating means by which said arm is carried, and a connection between said arm and said means permitting of a relative limited pivotal action.

9. A sand cutting machine having a swinging cutting shovel, an arm adapted to project substantially horizontally when the shovel is in lowered position and to the free end of which the shovel is fixed, oscillatory means on which said arm is mounted, a horizontal pivot between said arm and said means, and a stop for limiting the pivotal action between said parts.

10. A sand cutting machine having a scoop shaped shovel, arms to which said shovel is connected for a limited pivotal movement, a segmental gear mechanism for oscillating said arms, a crank for oscillating said gear mechanism, and a motor for driving said crank.

11. A sand conditioning machine for foundries having a scoop-shaped cutting shovel, arms projecting longitudinally of the machine when in lowered position and to the outer ends of which the shovels are fixed, a second set of arms to which the first arms are connected for limited pivotal movement, a segmental gear mechanism for oscillating said second set of arms, a crank for oscillating said gear mechanism, and a motor for driving said crank.

12. A sand conditioning machine for foundries having a main traveling frame, a sand cutting member mounted on oscillating arms which depend from the frame when in a state of rest to enable the sand cutting member to be carried over a pile of sand, means projecting angularly from the depending arms to which the shovels are fixed, a motor for oscillating the depending arms, driving connections between said motor and said arms, and an auxiliary frame carried by the main frame and operable for raising and lowering and on which said auxiliary frame, a motor, said sand cutting member and driving connections are mounted.

13. A machine for conditioning foundry sand having a traveling frame and having a single sand cutting shovel extending the width of the frame, an oscillatable support for the shovel, arms projecting angularly from the support and to the free ends of which the shovel is fixed whereby the shovel may be carried over a pile of sand on the foundry floor, a vertically adjustable frame on the main frame on which said cutting shovel and its operating mechanism are carried, and means for balancing said vertically movable frame.

14. A sand cutting machine having an oscillatory sand cutting and conveying member having a limited arc of movement, operable to cut into a pile of sand and carry the latter beyond the front end of the machine in the direction of travel of the machine and a riddle projected from the front end of the machine and adapted to receive the sand discharged from said member.

In testimony whereof I affix my signature.

HUGO R. SLIVINSKI.